(12) United States Patent
Ueda

(10) Patent No.: US 6,469,994 B1
(45) Date of Patent: Oct. 22, 2002

(54) PACKET TRANSFER SYSTEM

(75) Inventor: Hitoshi Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/323,092

(22) Filed: Jun. 1, 1999

(30) Foreign Application Priority Data

Jun. 1, 1998 (JP) ........................................... 10-151506

(51) Int. Cl.[7] .............................. H04Q 7/00; H04J 3/00; G01R 31/08; H04B 1/38; H04M 1/00
(52) U.S. Cl. ...................... 370/329; 370/336; 370/328; 370/230; 370/443; 370/468; 370/462; 455/560
(58) Field of Search ................................ 370/252, 254, 370/229, 389, 341, 352, 351, 447, 443, 498, 444, 461, 336, 462, 337, 468, 328, 329, 230; 455/466, 561, 560

(56) References Cited

U.S. PATENT DOCUMENTS 5,673,259 A  *  9/1997  Quick, Jr. .................... 370/342
6,347,091 B1 *  2/2002  Wallentin et al. ........... 370/328

FOREIGN PATENT DOCUMENTS

| JP | 7-023449  | 6/1993 |
| JP | 9-214519  | 2/1996 |
| JP | 10-32605  | 2/1998 |
| JP | 11-266262 | 9/1999 |

* cited by examiner

Primary Examiner—Nay Maung
Assistant Examiner—Ray Persino
(74) Attorney, Agent, or Firm—Foley & Lardner

(57) ABSTRACT

A packet transfer system for transferring data from or to a plurality of terminals while sectioning the data into given data-length packets, the system having a communication system that has the plurality of terminals, a base station connected through a wireless line with the plurality of terminals and a switching office connected through one or more wired lines with the base station, the wired lines being of shared channels that the plurality of terminals can use commonly and a leased channel that one terminal can use exclusively. When the amount of data transferred from or to one of the plurality of terminals is greater than a predetermined value, one of the shared channels is assigned exclusively to the one of the plurality of terminals or the leased channel is assigned to the one of the plurality of terminals.

23 Claims, 8 Drawing Sheets

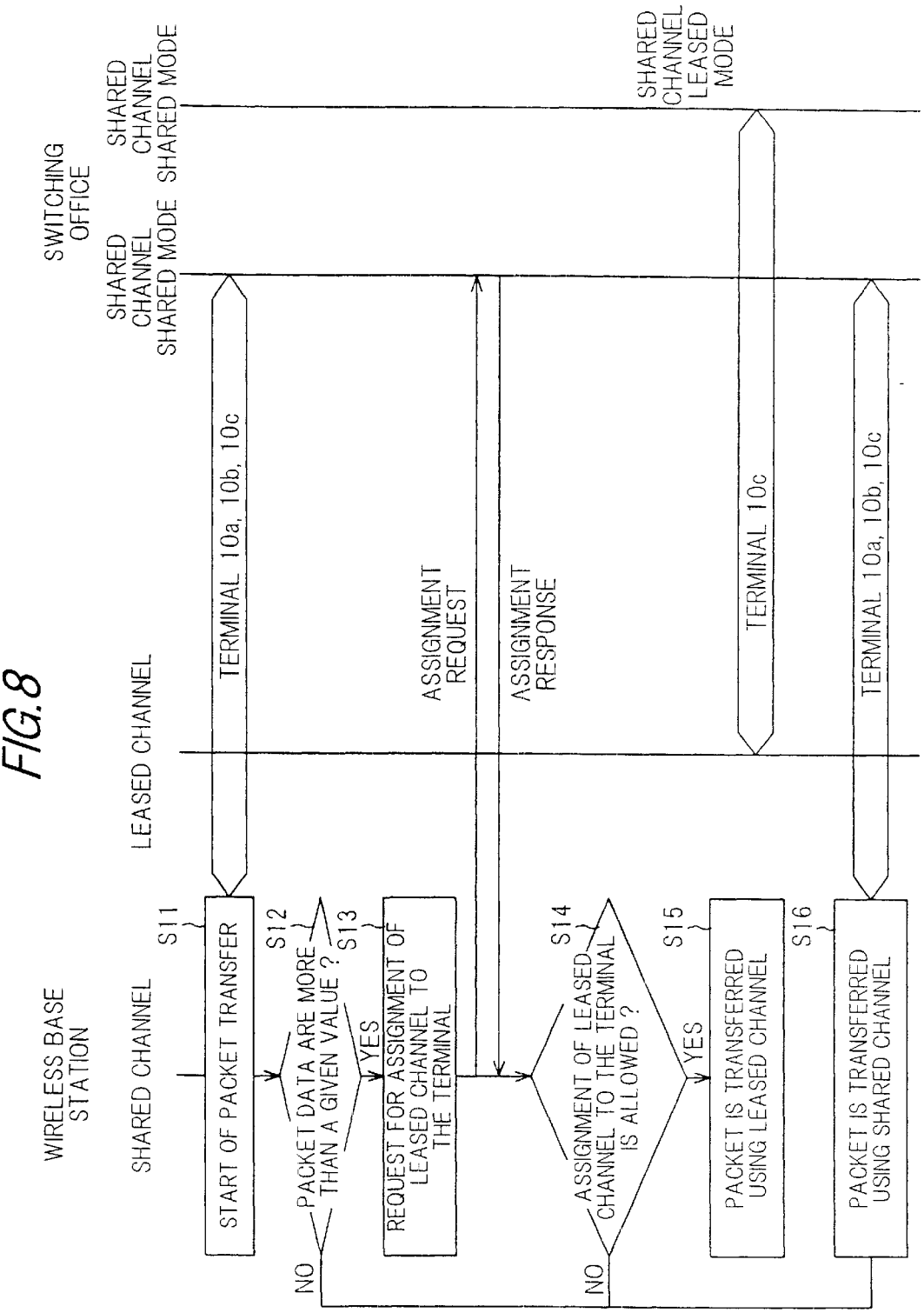

PACKET TRANSFER SYSTEM

FIELD OF THE INVENTION

This invention relates to a system for transferring packet data.

BACKGROUND OF THE INVENTION

Packet transfer systems, where data are transferred within a wired section of communication network while being sectioned into given data-length packets each of which is provided with a destination code, are of a connectionless type that without establishing a line when calling a packet, packet data are transferred using shared channel and of a connection-oriented type that a leased channel is assigned to each user when calling a packet and then packet data are transferred using the leased channel.

FIG. 1 is an illustration showing a connectionless type packet transfer system.

As shown in FIG. 1, a communication system that the conventional connectionless type packet transfer system is applied is composed of multiple terminals 110a to 110c, a wireless base station 120 that is connected through wireless lines with the terminals 110a to 110c, and a packet switching office 130 that is connected through wired packet lines with the wireless base station 120. The packet switching office 130 is connected with a network 140, such as a packet network as a public network and PSTN as a circuit switched network. Also, in the packet switching office 130, packet terminal equipment 135 to perform a Layer 2 protocol terminal function is provided, where the other Layer 2 protocol terminal function is performed by the terminals 110a to 110c.

In the communication system using the connectionless type packet transfer system, all the lines between the wireless base station 120 and the packet switching office 130 are used as shared channels that the multiple terminals 110a to 110c can use commonly. So, through one channel, the transferring of packet data by the terminals 110a to 110c may be performed.

FIG. 2 is an illustration showing a connection-oriented type packet transfer system.

As shown in FIG. 2, a communication system that the conventional connection-oriented type packet transfer system is applied is similar to that in FIG. 1.

In the communication system using the conventional connection-oriented type packet transfer system, when calling a packet, multiple channels between the wireless base station 120 and the packet switching office 130 are used as leased channels each of which only one of the terminals 110a to 110c can use, where the transferring of packet data by the terminals 110a to 110c can be performed using the leased channels assigned to the respective terminals 110a to 110c.

However, in the conventional packet transfer systems, the following problems may occur.

(1) In the connectionless type packet transfer system, since one channel is used commonly by multiple users, the utilization efficiency per one channel is enhanced. However, the retransmission throughput for guaranteeing the packet data of multiple users at that channel must be reduced.

(2) In the connection-oriented type packet transfer system, since one channel is assigned to one user, the retransmission throughput at that channel is enhanced. However, since the leased channel is used exclusively by one user from calling to releasing of packet, the hard physical quantity must increase.

Also, when packet data are transferred intermittently, the leased channel will be established even when there is no data transferred. Therefore, the ineffective reserved hard resource must increase. Here, for the packet communications, the per-unit charging system (charging based on the amount of information transferred) is employed in place of the time charging system (charging based on the time during the line is used) for line switching. Therefore, in the above case, a wasteful cost will occur.

SUMMARY OF THE INVENTION

Accordingly, it is an object of the invention to provide a packet transfer system that packet data can be transferred efficiently without reducing the retransmission throughput of line and without increasing the hard physical quantity.

According to the invention, a packet transfer system for transferring data from a plurality of terminals while sectioning the data into given data-length packets, comprises:
a communication system that is composed of the plurality of terminals, a base station connected through a wireless line with the plurality of terminals and a switching office connected through one or more wired lines with the base station, the wired lines being composed of shared channels that the plurality of terminals can use commonly;
wherein when the amount of data transferred from one of the plurality of terminals is greater than a predetermined value, one of the shared channels is assigned exclusively to the one of the plurality of terminals and data transferred from the one of the plurality of terminals is transferred using only the one of the shared channels.

According to another aspect of the invention, a packet transfer system for transferring data to a plurality of terminals while sectioning the data into given data-length packets, comprises:
a communication system that is composed of the plurality or terminals, a base station connected through a wireless line with the plurality of terminals and a switching office connected through one or more wired lines with the base station, the wired lines being composed of shared channels that the plurality of terminals can use commonly;
wherein when the amount of data transferred to one of the plurality of terminals is greater than a predetermined value, one of the shared channels is assigned exclusively to the one of the plurality of terminals and data transferred to the one of the plurality of terminals is transferred using only the one of the shared channels.

According to another aspect of the invention, a packet transfer system for transferring data from a plurality of terminals while sectioning the data into given data-length packets, comprises:
a communication system that is composed of the plurality of terminals, a base station connected through a wireless line with the plurality of terminals and a stitching office connected through one or more wired lines with the base station, the wired lines being composed of shared channels that the plurality of terminals can use commonly and a leased channel that only one of the plurality of terminals can use;
wherein only when the amount of data transferred from one of the plurality of terminals is greater than a predetermined value, the leased channel is assigned to the one of the plurality of terminals and data transferred from the one of the plurality of terminals is transferred using the leased channel.

According to another aspect of the invention, a packet transfer system for transferring data to a plurality of terminals while sectioning the data into given data-length packets, comprises:

a communication system that is composed of the plurality of terminals, a base station connected through a wireless line with the plurality of terminals and a switching office connected through one or more wired lines with the base station, the wired lines being composed of shared channels that the plurality of terminals can use commonly and a leased channel that only one of the plurality of terminals can use;

wherein only when the amount of data transferred to one of the plurality of terminals is greater than a predetermined value, the leased channel is assigned to the one of the plurality of terminals and data transferred to the one of the plurality of terminals is transferred using the leased channel.

According to another aspect of the invention, a packer transfer system for transferring data from a plurality of terminals while sectioning the data into given data-length packets, comprises:

a communication system that is composed of the plurality of terminals, a base station connected through a wireless line with the plurality of terminals and a switching office connected through one or more wired lines with the base station, the wired lines being composed of shared channels that the plurality of terminals can use commonly;

wherein the base station is composed of means for counting packet data transferred from the plurality of terminals, the counting means being provided for each of the plurality of terminals, a mode switching means for switching the shared channels into a shared mode that the plurality of terminals can use commonly or a leased mode that one of the plurality of terminals can use exclusively, the mode switching means being provided for each of the shared channels, and a control means for comparing a count value of the counting means with a predetermined value and controlling the operation of the mode switching means based on the comparison result, wherein the control means, when the count value of the counting means is greater than the predetermined value, controls the mode switching means to switch one of the shared channels into the leased mode that concerned one of the plurality of terminals can use exclusively.

According to another aspect of the invention, a packet transfer system for transferring data from a plurality of terminals while sectioning the data into given data-length packets, comprises:

a communication system that is composed of the plurality of terminals, a base station connected through a wireless line with the plurality of terminals and a switching office connected through one or more wired lines with the base station, the wired lines being composed of shared channels that the plurality of terminals can use commonly and a leased channel that only one of the plurality of terminals can use;

wherein the base station is composed of means for counting packet data transferred from the plurality of terminals, the counting mean; being provided for each of the plurality of terminals, and a control means for comparing a count value of the counting means with a predetermined value and controlling the setting of the wired lines to the plurality of terminals based on the comparison result, wherein the control means, when the count value of the counting means is greater than the predetermined value, controls the leased channel to be set to concerned one of the plurality of terminals.

In this invention, when data transferred from or to a terminal is greater than a predetermined value, one of shared channels is assigned exclusively to the terminal and data is transferred from or to the terminal using only the assigned channel.

Thus, in normal packet transferring, the communications are performed using by the shared channel with leased mode, and when specific-calling traffic increases, one of shared channels is switched into a leased mode that only the specific calling uses the channel. Since only the specific calling is transferred using the channel, packet data can be transferred efficiently without reducing the retransmission throughput of line and without increasing the hard physical quantity.

Alternatively, when data transferred from or to a terminal is greater than a predetermined value, a leased channel that one terminal can use exclusively is assigned to the terminal and data is transferred from or to the terminal using only the leased channel.

Thus, in normal packet transferring, the communications are performed using by the shared channel with leased mode, and when specific calling traffic increases, the leased channel is newly assigned to the specific calling. Since only the specific calling is transferred using the leased channel, packet data can be transferred efficiently without reducing the retransmission throughput of line and without increasing the hard physical quantity.

BRIEF DESCRIPTION OF THE DRAWING

The invention will be explained in more detail in conjunction with the appended drawings, wherein:

FIG. 8 is a flow chart showing an operation of the packet transfer system in FIG. 6.

DESCRIPTION OF THE PREFERRED EMBODIMENTS

Figure 1:
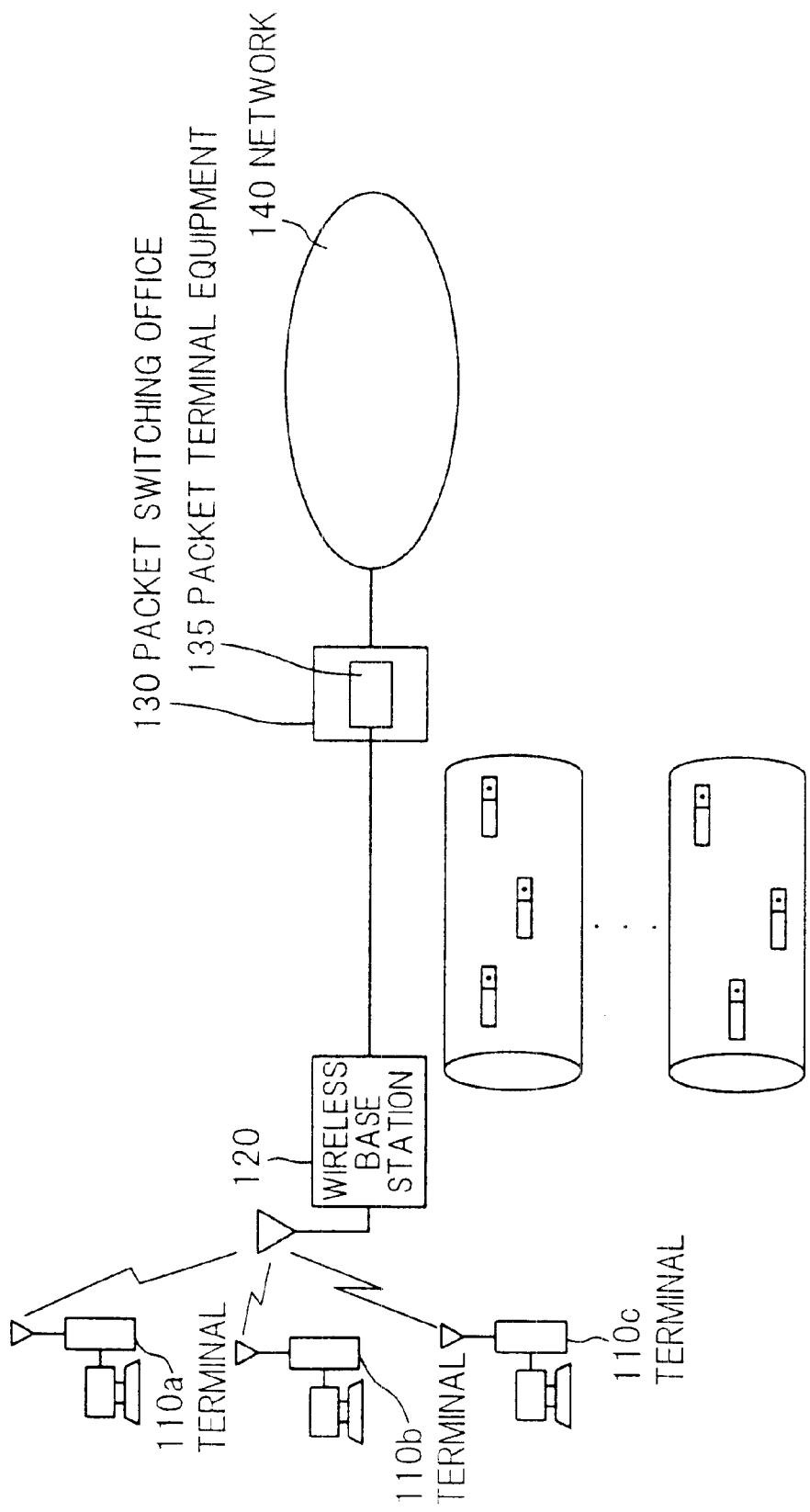
FIG. 1 is an illustration showing a conventional connectionless type of packet transfer system.
Figure 2:
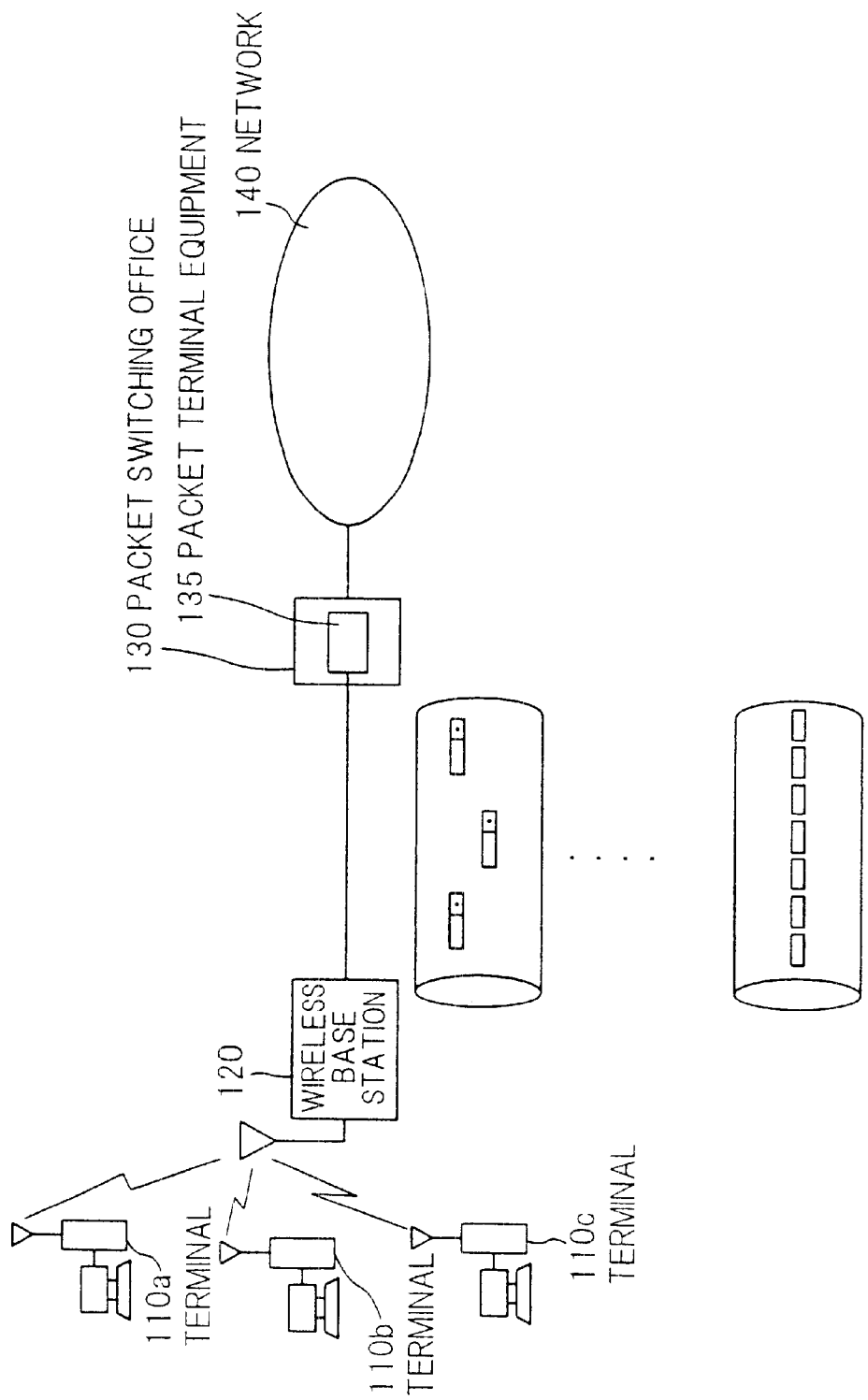
FIG. 2 is an illustration showing a conventional connection-oriented type of packet transfer system.

The preferred embodiments of the invention will be explained below, referring to the drawings.

<First Embodiment>

Figure 3:
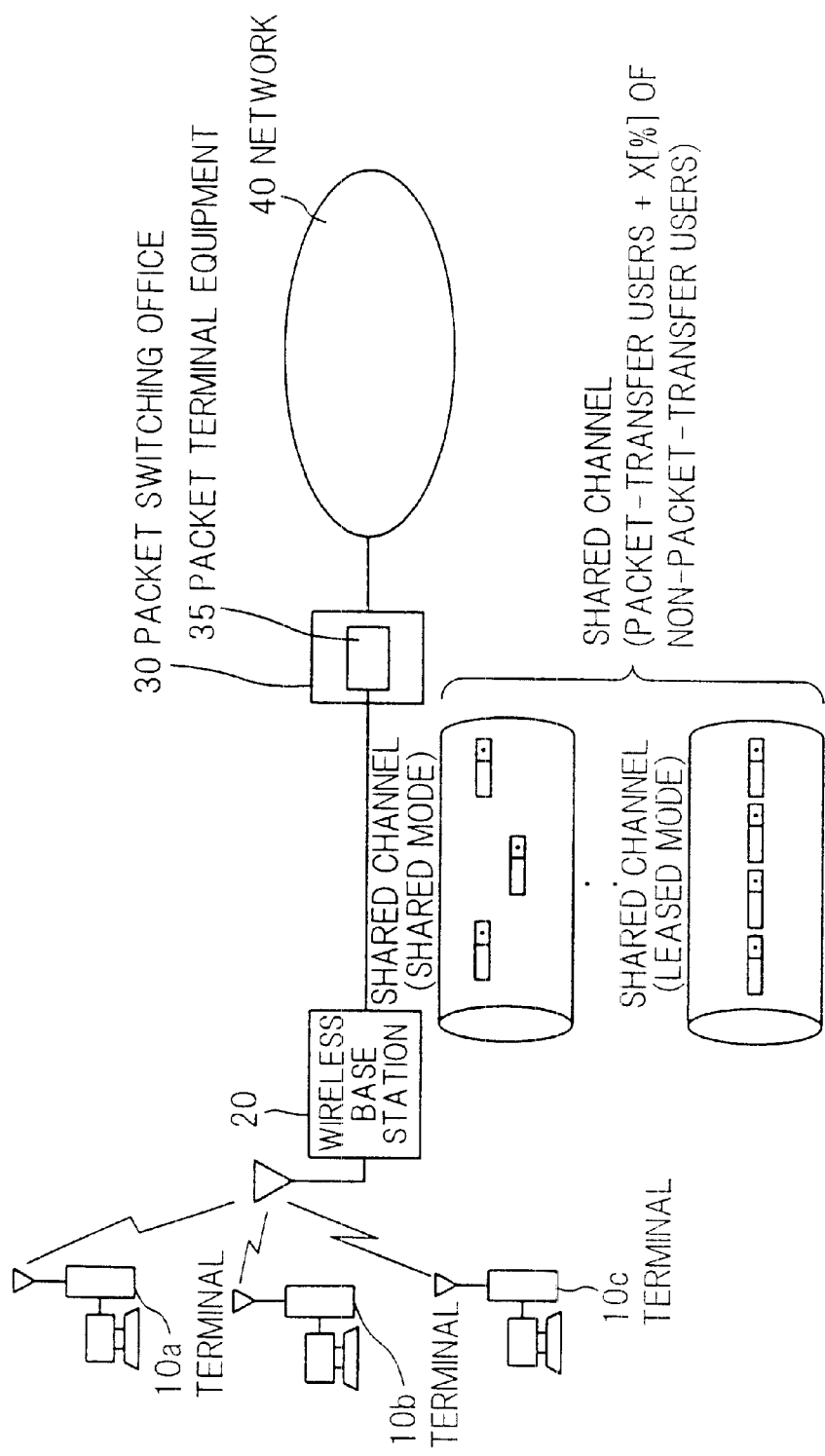
FIG. 3 is an illustration showing a packet transfer system in a first preferred embodiment according to the invention.

FIG. 3 is an illustration showing a packet transfer system in the first preferred embodiment according to the invention.

The system in the first embodiment is, as shown in FIG. 3, is composed of multiple terminals 10a to 10c, a wireless base station that is connected through wireless lines with the terminals 10a to 10c, and a packet switching office 30 that is connected through wired packet lines with the wireless base station 20. The packet switching office 30 is connected with a network 40, such as a packet network as a public network and PSTN as a circuit switched network. Also, in the packet switching office 30, packer terminal equipment to perform a Layer 2 protocol terminal function is provided, where the other Layer 2 protocol terminal function is performed by the terminals 10a to 10c.

Although in FIG. 3 only the three terminals 10a to 10c are shown, the other several terminals exist.

In this embodiment, the wired lines connecting the wireless base station 20 with the packet switching office 30 are of a shared channel type that multiple terminals can use commonly.

Meanwhile, in the shared channels, channels equal to the sum of the number of users who use currently the packet transfer and the number of a predetermined percentage of users (non-packet-transfer users) who have the packet transfer contract and do not use currently the packet transfer are established. They are always ready to transfer packets. The total number is predetermined in reference to the number of peak-hour calls on the previous day.

Also, the shared channels in this embodiment can be set to a shared mode that multiple terminals can use the channel commonly and a leased mode that one terminal uses the channel exclusively.

Figure 4:
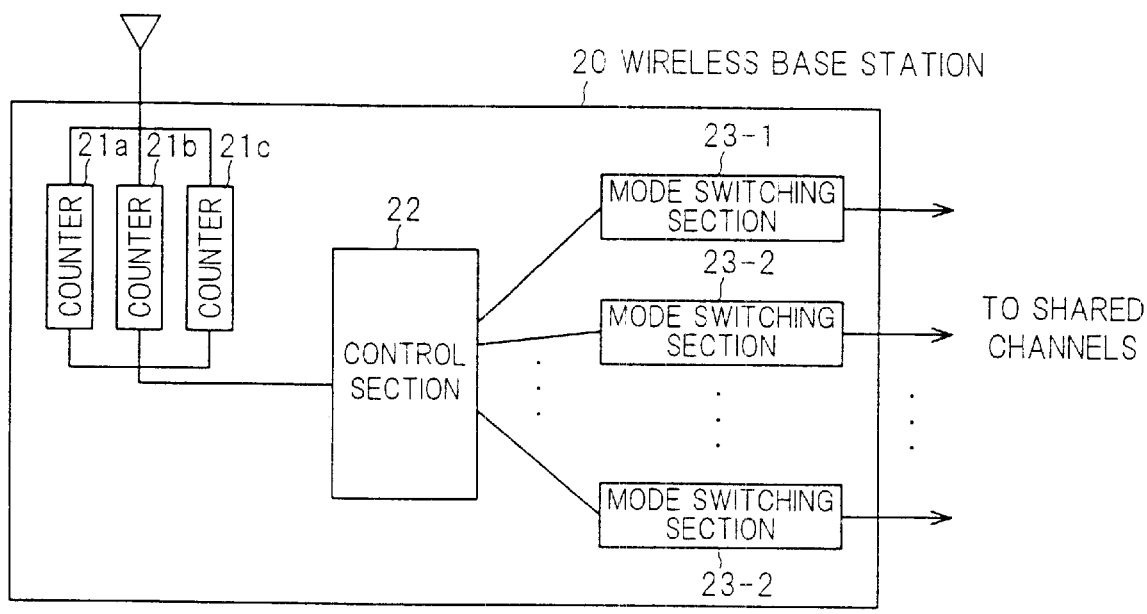
FIG. 4 is a block diagram showing the composition of a wireless base station in FIG. 3.

FIG. 4 is a block diagram showing a composition of the wireless base station 20 in FIG. 3.

As shown in FIG. 4, the wireless base station 20 is composed of counters 21a to 21c each of which counts packet data transferred from the corresponding one of the terminals 10a to 10c, mode switching sections 23-1 to 23-n that are provided for the respective shared channels and switch the mode of shared channel into the shared mode or leased mode, and a control section 22 that compares the count values of the counters 21a to 21c with a predetermined value and controls the operation of the mode switching sections 23-1 to 23-n based on the comparison result.

The operation or the packet transfer system thus composed is explained below.

Figure 5:
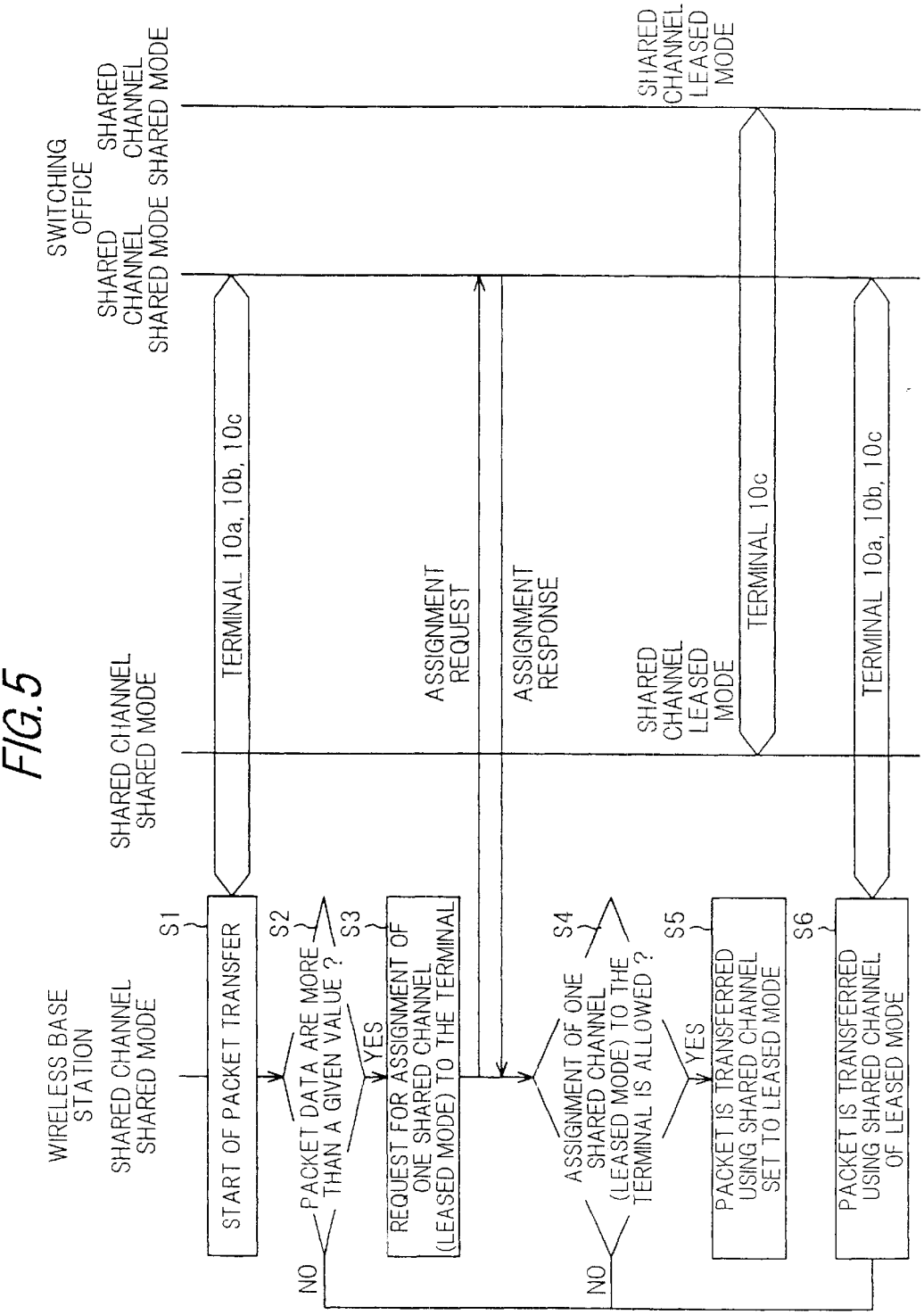
FIG. 5 is a flow chart showing an operation of the packet transfer system in FIG. 3.

FIG. 5 is a flow chart showing the operation of the packet transfer system in FIG. 3.

When the packet transfer at the terminals 10a to 10c starts (step S1), the counters 21a to 21c of the wireless base station 20 count packet data transferred from the terminals 10a to 10c.

Then, in the control section 22 of the wireless base station 20, the count values at the counters 21a to 21c are compared with a predetermined value, and it is judged whether the packet data transferred from the terminals 10a to 10c are greater than the predetermined value or not (step S2). Meanwhile, to each of packet data transferred from the terminals, a user ID to indicate each property is added. Also, the predetermined value, which is the criteria of judgement, can be changed according to the number of callings.

When it is judged that the packet data transferred from one of the terminals 10a to 10c at step S2 is greater than the predetermined value, the control section 22 requests for the packet switching office 30 to set one of the shared channels into the leased mode and to assign it to that terminal (step S3). For example, in this embodiment, it is assumed that the packet data transferred from the terminal 10c is greater than the predetermined value. In this case, through the shared channel, the control section 22 of the wireless base station 20 requests for the packet switching office 30 to set one of the shared channels into the leased mode and to assign it to the terminal 10c. Meanwhile, the channel used in requesting for assigning it to the terminal 10c is different From the channel used in transferring that request from the control section 22 of the wireless base station 20 to the packet switching office 30.

Then, in the packet switching office 30, it is judged whether one of the shared channels is allowed to be set to the leased mode and to be assigned to the terminal 10c or not (step S4).

When at step S4 it is judged that one of the shared channels is allowed to be set to the leased mode and to be assigned to the terminal 10c, this judgement is sent to the control section 22 of the wireless base station 20. Then, by the control of the control section 22, of the mode switching sections 23-1 to 23-n, a mode switching section provided for the shared channel to be set to the leased mode is controlled to operate. Thereby, the concerned shared channel is met to the leased mode, and then the packet data is transferred from the terminal 10c, using the shared channel set to the leased mode (step S5).

On the other hand, when at step S2 it is judged that packet data transferred from the terminal 10c is fewer than the predetermined value, or when at step S4 it is judged that one of the shared channels is not allowed to be set to the leased mode and to be assigned to the terminal 10c, the packet data is transferred using the shared channel of shared mode (step S6). Meanwhile, in this embodiment, since the packet data transferred from the terminals 10a, 10b are fewer than the predetermined value, for the terminals 10a, 10b, the packet data are transferred using the shared channel of shared mode.

Also, in transferring packet data from the packet switching office 30 to the wireless base station 20, similar operations to those described above are conducted. In this case, the Layer 2 protocol termination is conducted between the terminals 10a to 10c and the packet terminal equipment 35. The retransmission control for when retransmission is required including the wireless section is conducted between the Layer 2 protocol, for each user ID. This user ID is administered by an anchor packet switching office (not shown) where ID does not change even when a hand-over etc. occurs.

After completing the transferring of packet data, the number of shared channels set to the shared mode is detected, and based on the channel number detected, the shared channel set to the leased mode is returned to the shared mode or released.

<Second Embodiment>

Figure 6:
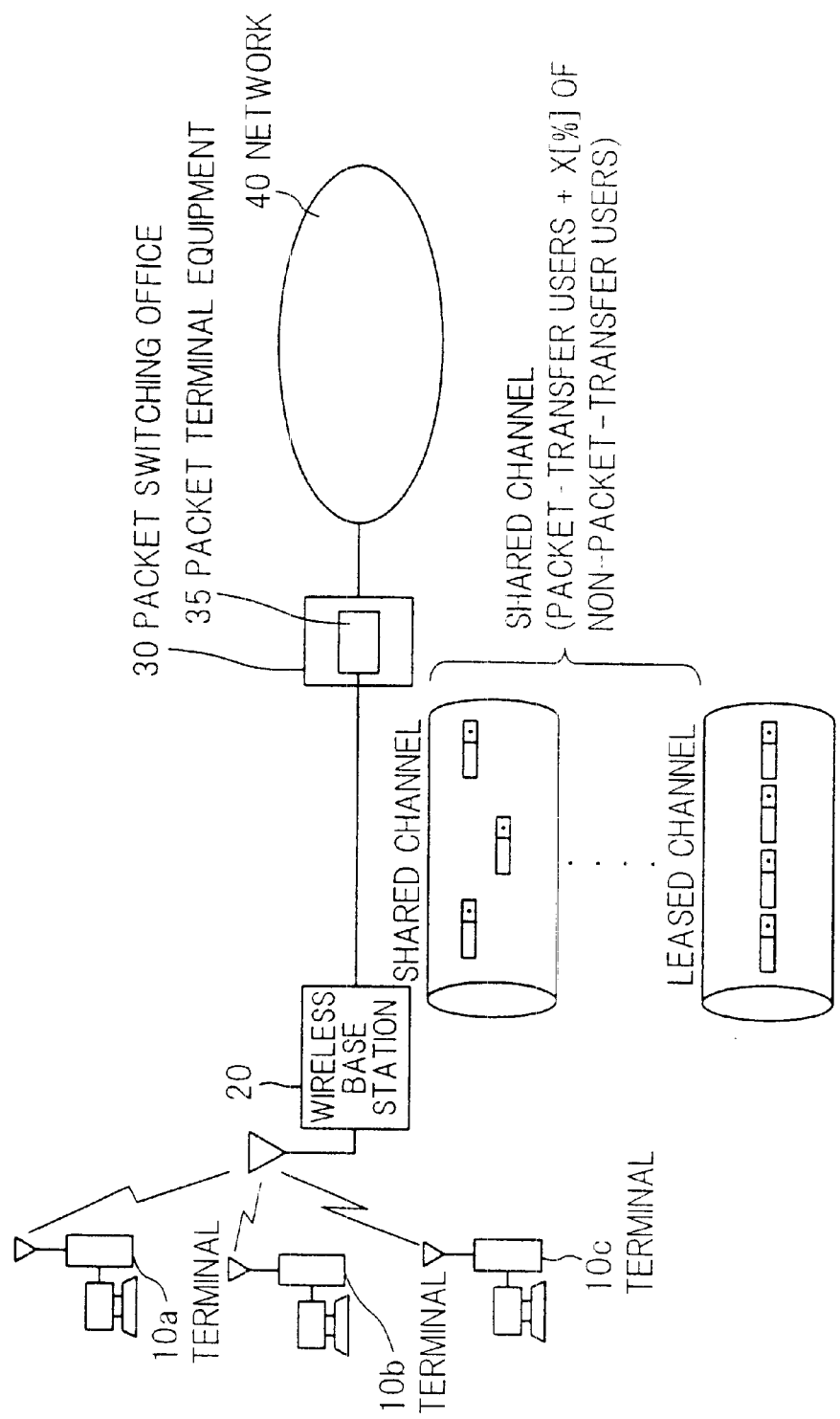
FIG. 6 is an illustration showing a packet transfer system in second preferred embodiment according to the invention.
Figure 7:
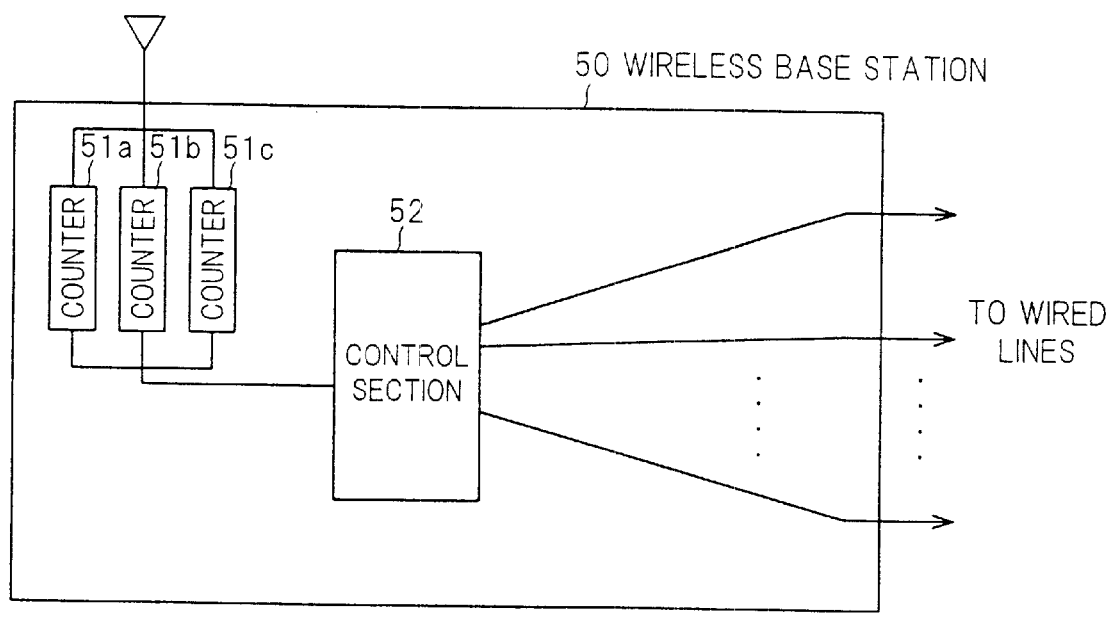
FIG. 7 is a block diagram showing the composition of a wireless base station in FIG. 6.

FIG. 6 is an illustration showing a packet transfer system in the second preferred embodiment according to the invention. FIG. 7 is a block diagram showing a composition of a wireless base station 50 in FIG. 6.

As shown in FIGS. 6 and 7, this embodiment has a composition similar to that in FIG. 3, except the wireless base station 50. The wired lines to connect the wireless base station 50 and the packet switching office 30 are composed of shared channels that multiple terminals can use commonly and a leased channel that one terminal can use exclusively.

Also, the wireless base station 50 in this embodiment is, as shown in FIG. 7, composed of counters 51a to 51c each of which counts packet data transferred from the corresponding one of the terminals 10a to 10c, and a control section 52 that compares the count values of the counters 51a to 51c with a predetermined value and controls the setting of the shared channels and leased channel based on the comparison result.

The operation of the packet transfer system in this embodiment is explained below.

FIG. 8 is a flow chart showing the operation of the packet transfer system in FIG. 6.

When the packet transfer at the terminals 10a to 10c starts (step S1) the counters 51a to 51c of the wireless base station 50 count packet data transferred from the terminals 10a to 10c.

Then, in the control section 52 of the wireless base station 50, the count values at the counters 51a to 51c are compared with a predetermined value, and it is judged whether the packet data transferred from the terminals 10a to 10c are greater than the predetermined value or not (step 312). Meanwhile, to each of packet data transferred from the terminals, a user ID to indicate each property is added. Also, the predetermined value, which is the criteria of judgement, can be changed according to the number of callings.

When at step S2 it is judged that the packet data transferred from one of the terminals 10a to 10c is greater than the predetermined value, the control section 52 requests for the packet switching office 30 to assign the leased channel to that terminal (step S13). For example, in this embodiment, it is assumed that the packet data transferred from the terminal 10c is greater than the predetermined value. In this case, through the shared channel, the control section 52 of the wireless base station 50 requests for the packet switching office 30 to assign the leased channel to the terminal 10c.

Then, in the packet switching office 30, it is judged whether the leased channel is allowed to be assigned to the terminal 10c or not (step S14).

When at step S14 it is judged that the leased channel is allowed to be assigned to the terminal 10c, this judgement is sent to the control section 52 of the wireless base station 50. Then, by the control of the control section 52, the leased channel is set to the terminal 10c, and then the packet data is transferred from the terminal 10c, using the leased channel (step S15). Here, when the packet data is transferred using the leased channel, since the terminal and the leased channel are corresponding to each other in one-to-one relation, no user ID is necessary to add to the packet data.

On the other hand, when at step S12 it is judged that packet data transferred from the terminal 10c is fewer than the predetermined value, or when at step S14 it is judged that the leased channel is not allowed to be assigned to the terminal 10c, the packet data is transferred using the shared channel (step S16). Meanwhile, in this embodiment, since the packet data transferred from the terminals 10a, 10b are fewer than the predetermined value, for the terminals 10a, 10b, the packet data are transferred using the shared channel.

Also, in transferring packet data from the packet switching office 30 to the wireless base station 50, similar operations to those described above are conducted. In this case, the Layer 2 protocol termination is conducted between the terminals 10a to 10c and the packet terminal equipment 35. The retransmission control for when retransmission is required including the wireless section is conducted between the Layer 2 protocol, for each user ID. This user ID is administered by an anchor packet switching office (not shown) where ID does not change even when a hand-over etc. occurs.

After completing the transferring of packet data, the leased channel is released.

<Third Embodiment>

In the first and second embodiments described above, at the wireless base station, it is judged whether the packet data transferred from each of the terminals 10a to 10c is greater than the predetermined value. However, when the packer data transferred from each of the terminals 10a to 10c is greater than the predetermined value, at the terminals 10a to 10c such information may be added to the packet data and then transferred to the wireless base station with the packet data. Then, the control section of the wireless base station may detect the information, and based on the information the mode switching of shared channel or the setting of leased channel can be performed.

For such a case, the counters 21a to 21c and 51a to 51c are not necessary. The information about whether the packet data transferred from each of the terminals 10a to 10c is greater than the predetermined value is sent directly to the control section 22, 52 from tho terminals 10a to 10c. Based an the information, the control section 22, 52 operates.

Advantages of the Invention (1) When data transferred from or to the terminal is greater than a predetermined value, one of shared channels is assigned exclusively to the terminal and the data transferred from or to the terminal is transferred using only the assigned channel. Therefore, without reducing the retransmission throughput of line and without increasing the hard physical quantity, the packet data can be transferred efficiently.

(2) When data transferred from or to the terminal is greater than a predetermined value, a leased channel that only one terminal can use is assigned to the terminal and the data transferred from or to the terminal is transferred using only the leased channel. Therefore, like effect described above can be obtained.

Also, since no user ID is necessary to add to the packet data, the data transfer in wired section can be made further efficient.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A packet transfer system for transferring data from a plurality of terminals while sectioning said data into given data-length packets, comprising:

a communication system that is composed of said plurality or terminals, a base station connected through a wireless line with said plurality of terminals and a switching office connected through one or more wired lines with said bare station, said wired lines being composed of shared channels that said plurality of terminals can use commonly;

wherein when the amount of data transferred from one of said plurality of terminals is greater than a predetermined value, one of said shared channels is assigned exclusively to said one of said plurality of terminals and data transferred from said one of said plurality of terminals is transferred using only said one of said shared channels.

2. A packet transfer system, according to claim 1, wherein:

said base station judges whether the amount of data transferred from one of said plurality of terminals is greater than the predetermined value, if so, then requesting said switching office to assign one of said shared channels exclusively to said one of said plurality of terminals;

said switching office, when requested to assign one of said shared channels exclusively to said one of said plurality of terminals by said base station, judges whether it is allowable to assign one of said shared channels exclusively to said one of said plurality of terminals, then informing said base station or the judgement result; and said base station, when informed that it is allowed to assign one of said shared channels exclusively to said one of said plurality of terminals, assigns one of said shared channels exclusively to said one of said plurality of terminals.

3. A packet transfer system, according to claim 1, wherein:

one of said plurality of terminals judges whether the amount of data transferred from said one of said plurality of terminals is greater than the predetermined value, if so, then adding information that the amount of data transferred from said one of said plurality of terminals is greater than the predetermined value to said data, sending it to said base station;

said base station, when informed of said information by said office to assign one of said shared channels exclusively to said one of said plurality of terminals;

said switching office, when requested to assign one of said shared channels exclusively to said one of said plurality or terminals by said base station, judges whether it is allowable to assign one of said shared channels exclusively to said one of said plurality of terminals, then informing said base station of the judgement result; and said base station, when informed that it is allowed to assign one of said shared channels exclusively to said one of said plurality of terminals by said switching office, assigns one of said shared channels exclusively to said one of said plurality of terminals.

4. A packet transfer system, according to claim 2, wherein:

said requesting to said switching office by said base station is conducted using one of said shared channels channel different from said one of said shared channels assigned exclusively to said one of said plurality of terminals.

5. A packet transfer system, according to claim 3, wherein:

said requesting to said switching office by said base station is conducted using one of said shared channels channel different from said one of said shared channels assigned exclusively to said one of said plurality of terminals.

6. A packet transfer system for transferring data to a plurality of terminals while sectioning said data into given data-length packets, comprising:

a communication system that is composed of said plurality of terminals, abase station connected through a wireless line with said plurality of terminals and a switching office connected through one or more wired lines with Raid base station, said wired lines being composed of shared channels that said plurality of terminals can use commonly;

wherein when the amount of data transferred to one of said plurality of terminals is greater than a predetermined value, one of said shared channels is assigned exclusively to said one of said plurality of terminals and data transferred to said one of said plurality of terminals is transferred using only said one of said shared channels.

7. A packet transfer system, according to claim 6, wherein:

said switching office judges whether the amount of data transferred to one of said plurality of terminals is greater than the predetermined value, if so, then requesting said base station to assign one of said shared channels exclusively to said one of said plurality of terminals;

said base station, when requested to assign one of said shared channels exclusively to said one of said plurality of terminals by said switching office, judges whether it is allowable to assign one of said shared channels exclusively to said one of said plurality of terminals, then informing said switching office of the judgement result; and said switching office, when informed that it is allowed to assign one of said shared channels exclusively to said one of said plurality or terminals by said base station, assigns one of said shared channels exclusively to said one of said plurality of terminals.

8. A packet transfer system, according to claim 7, wherein:

said requesting to said base station by said switching office is conducted using one of said shared channels channel different from said one of said shared channels assigned exclusively to said one of said plurality of terminals.

9. A packet transfer system, according to claim 1, wherein:

when completing the transfer of data at the terminal to which one of said shared channels is assigned exclusively, the number of shared channels that are not assigned exclusively to any of said plurality of terminals is detected, and based on the detection result, a channel assigned exclusively to said one of said plurality of terminals is set to a shared channel that said plurality of terminals can use commonly.

10. A packet transfer system, according to claim 6, wherein:

when completing the transfer of data at the terminal to which one of said shared channels is assigned exclusively, the number of shared channels that are not assigned exclusively to any of said plurality of terminals is detected, and based on the detection result, a channel assigned exclusively to said one of said plurality of terminals is set to a shared channel that said plurality of terminals can use commonly.

11. A packet transfer system for transferring data from a plurality of terminal while sectioning said data into given data-length packets, comprising:

a communication system that is composed of said plurality of terminals, a base station connected through a wireless line with said plurality of terminals and a switching office connected through one or more wired lines with said base station, said wired lines being composed of shared channels that said plurality of terminals can use commonly and a leased channel that only one of said plurality of terminals can use;

wherein only when the amount of data transferred from one of said plurality of terminals is greater than a predetermined value, said leased channel is assigned to said one of said plurality of terminals and data transferred from said one or said plurality of terminals is transferred using said leased channel.

12. A packet transfer system, according to claim 11, wherein:

said base station judges whether the amount of data transferred from one of said plurality of terminals is greater than the predetermined value, if so, then requesting said switching office to assign said leased channel to said one of said plurality of terminals;

said switching office, when requested to assign said leased channel to said one of said plurality of terminals by said base station, judges whether it is allowable to assign said leased channel to said one of said plurality of terminals, then informing said base station of the judgement result; and said base station, when informed that it is allowed to assign said leased channel to said one of said plurality of terminals, assigns said leased channel to said one of said plurality of terminals.

13. A packet transfer system, according to claim 11, wherein:

one of said plurality of terminals judges whether the amount of data transferred from said one of said plurality of terminals is greater than the predetermined value, if so, then adding information that the amount of data transferred from said one of said plurality of terminals is greater than the predetermined value to said data, sending it to said base station;

said base station, when informed of said information by said one of said plurality of terminals, then requesting said switching office to assign said leased channel to said one of said plurality of terminals;

said switching office, when requested to assign said leased channel to said one of said plurality of terminals by said base station, judges whether it is allowable to assign said leased channel to said one of said plurality of terminals, then informing said base station of the judgement result; and said base station, when informed that it is allowed to assign said leased channel to said one of said plurality of terminals by said switching office, assigns said leased channel to said one of said plurality of terminals.

14. A packet transfer system for transferring data to a plurality of terminals while sectioning said data into given data-length packet, comprising:

a communication system that is composed of said plurality of terminals, a base station connected through a wireless line with said plurality of terminals and a switching office connected through one or more wired lines with said base station, said wired lines being composed of shared channels that said plurality of terminals can use commonly and a leased channel that only one of said plurality of terminals can use;

wherein only when the amount of data transferred to one of said plurality of terminals is greater than a predetermined value, said leased channel is assigned to said one of said plurality of terminals and data transferred to said one of said plurality of terminals is transferred using arid leased channel.

15. A packet transfer system, according to claim 14, wherein:

said switching office judges whether the amount of data transferred to one of said plurality of terminals is greater than the predetermined value, if so, then requesting said base station to assign said leased channel to said one of said plurality of terminals;

said base station, when requested to assign said leased channel to said one of said plurality of terminals by said switching office, judges whether it is allowable to assign said leased channel to said one of said plurality of terminals, then informing said switching office of the judgement result; and said switching office, when informed that it is allowed to assign said leased channel to said one of said plurality of terminals by said bass station, assigns said leased channel to said one of said plurality of terminals.

16. A packet transfer system, according to claim 1, wherein:

said predetermined value is alterable according to the number of callings.

17. A packet transfer system, according to claim 6, wherein:

said predetermined value is alterable according to the number of callings.

18. A packet transfer system, according to claim 11, wherein:

said predetermined value is alterable according to the number of callings.

19. A packet transfer system, according to claim 14, wherein:

said predetermined value is alterable according to the number of callings.

20. A packet transfer system for transferring data from a plurality of terminals while sectioning said data into given data-length packets, comprising:

a communication system that is composed of said plurality of terminals, a base station connected through a wireless line with said plurality of terminals and a switching office connected through one or more wired lines with said base station, said wired lines being composed of shared channels that said plurality of terminals can use commonly;

wherein said base station is composed of means for counting packet data transferred from said plurality of terminals, said counting means being provided for each of said plurality of terminals, a mode switching means for switching said shared channels into a shared mode that said plurality of terminals can use commonly or a leased mode that one of said plurality of terminals can use exclusively, said mode switching means being provided for each of said shared channels, and a control means for comparing a count value of said counting means with a predetermined value and controlling the operation of said mode switching means based on the comparison result, wherein said control means, when the count value of said counting means is greater than said predetermined value, controls said mode switching means to switch one of said shared channels into the leased mode that concerned one of said plurality of terminals can use exclusively.

21. A packet transfer system for transferring data from a plurality of terminals while sectioning said data into given data-length packets, comprising:

a communication system that is composed of said plurality of terminals, a base station connected through a wireless line with said plurality of terminals and a switching office connected through one or more wired lines with said base station, said wired lines being composed of shared channels that said plurality of terminals can use commonly and a leased channel that only one of said plurality of terminals can use;

wherein said base station is composed of means for counting packet data transferred from said plurality of terminals, said counting means being provided for each of said plurality of terminals, and a control means for comparing a count value of said counting means with a predetermined value and controlling the setting of said wired lines to said plurality of terminals based on the comparison result, wherein said control means, when the count value of said counting means is greater than said predetermined value, controls said leased channel to be set to concerned one of said plurality of terminals.

22. A packet transfer system, according to claim 20, wherein:

said predetermined value is alterable according to the number of callings.

23. A packet transfer system, according to claim 21, wherein;

said predetermined value is alterable according to the number of callings.

\* \* \* \* \*